United States Patent
Seeley et al.

(10) Patent No.: US 12,158,266 B2
(45) Date of Patent: Dec. 3, 2024

(54) ABATEMENT

(71) Applicant: Edwards Limited, Burgess Hill (GB)

(72) Inventors: Andrew James Seeley, Clevedon (GB); Fraser Gray, Clevedon (GB)

(73) Assignee: Edwards Limited, Burgess Hill (GB)

( * ) Notice: Subject to any disclaimer, the term of this patent is extended or adjusted under 35 U.S.C. 154(b) by 759 days.

(21) Appl. No.: 17/296,101

(22) PCT Filed: Nov. 21, 2019

(86) PCT No.: PCT/GB2019/053294
§ 371 (c)(1),
(2) Date: May 21, 2021

(87) PCT Pub. No.: WO2020/104804
PCT Pub. Date: May 28, 2020

(65) Prior Publication Data
US 2022/0010960 A1  Jan. 13, 2022

(30) Foreign Application Priority Data

Nov. 22, 2018 (GB) ..................... 1819055

(51) Int. Cl.
*F23G 7/06* (2006.01)
*B01D 53/70* (2006.01)
(Continued)

(52) U.S. Cl.
CPC ............. *F23G 7/065* (2013.01); *B01D 53/70* (2013.01); *B01D 53/79* (2013.01); *F23D 14/12* (2013.01);
(Continued)

(58) Field of Classification Search
CPC ............. F23G 7/065; F23G 2209/142; F23G 2900/00001; F23D 14/145;
(Continued)

(56) References Cited

U.S. PATENT DOCUMENTS

| 3,982,878 A | 9/1976 | Yamane et al. |
| 4,650,416 A | 3/1987 | Warren, Jr. et al. |

(Continued)

FOREIGN PATENT DOCUMENTS

| GB | 2515017 A | 12/2014 |
| JP | H0942643 A | 2/1997 |

(Continued)

OTHER PUBLICATIONS

Taiwanese Search Report dated Dec. 31, 2022 for corresponding Taiwanese application Serial No. 108142486, 1 page.

(Continued)

*Primary Examiner* — David J Laux
(74) *Attorney, Agent, or Firm* — Theodore M. Magee; Westman, Champlin & Koehler, P.A.

(57) ABSTRACT

An abatement method is disclosed. The method comprises: supplying a combustion chamber of an abatement apparatus with an effluent stream containing a perfluoro compound, together with combustion reagents and a diluent; heating a combustion zone of said combustion chamber by reacting said combustion reagents to perform abatement of said perfluoro compound to stable by-products, said diluent being selected to remain inert during said abatement. In this way, the perfluoro or other compound is abated in the combustion chamber during the combustion of the combustion reagents, but without creating undesirable compounds such as, for example, NOx or other compounds.

17 Claims, 4 Drawing Sheets

(51) Int. Cl.
  *B01D 53/79* (2006.01)
  *F23D 14/12* (2006.01)
  *F23D 14/14* (2006.01)
(52) U.S. Cl.
  CPC ...... *F23D 14/145* (2013.01); *B01D 2251/102* (2013.01); *B01D 2251/104* (2013.01); *B01D 2251/208* (2013.01); *B01D 2257/2066* (2013.01); *F23D 2203/1012* (2013.01); *F23G 2209/142* (2013.01); *F23G 2900/00001* (2013.01); *F23L 2900/07002* (2013.01); *F23L 2900/07005* (2013.01)
(58) Field of Classification Search
  CPC .............. F23D 2203/1012; F23D 14/16; F23L 2900/07002; F23L 2900/07005; F23L 2900/07003
  See application file for complete search history.

(56) References Cited

U.S. PATENT DOCUMENTS

| | | | | |
|---|---|---|---|---|
| 5,674,064 | A * | 10/1997 | Francis, Jr. | C03B 5/2353 431/12 |
| 6,423,284 | B1 * | 7/2002 | Arno | B01D 53/68 423/240 R |
| 2006/0104879 | A1 * | 5/2006 | Chiu | F23G 7/065 422/171 |
| 2007/0169889 | A1 * | 7/2007 | Clark | C23C 16/4412 156/345.31 |
| 2007/0172398 | A1 * | 7/2007 | Clark | B01D 53/8659 431/185 |
| 2007/0172399 | A1 * | 7/2007 | Clark | C23C 16/4412 422/182 |
| 2007/0190469 | A1 * | 8/2007 | Clark | B01D 53/8659 431/5 |
| 2007/0217983 | A1 | 9/2007 | Stanton et al. | |
| 2007/0274876 | A1 * | 11/2007 | Chiu | F23M 5/085 422/173 |
| 2009/0053127 | A1 * | 2/2009 | Reid | C01B 3/386 423/418.2 |
| 2009/0064909 | A1 * | 3/2009 | Mennie | F23G 7/065 110/212 |
| 2010/0119984 | A1 | 5/2010 | Fox | |
| 2010/0275825 | A1 * | 11/2010 | Bool, III | F23K 1/00 110/297 |
| 2013/0192979 | A1 * | 8/2013 | Xu | F23J 7/00 422/186.21 |
| 2017/0320012 | A1 | 11/2017 | Kaneshiro et al. | |
| 2018/0073732 | A1 * | 3/2018 | Seeley | F23D 14/16 |

FOREIGN PATENT DOCUMENTS

| | | |
|---|---|---|
| TW | 201023244 A | 6/2010 |
| TW | 201714662 A | 5/2017 |
| WO | 0062905 A1 | 10/2000 |
| WO | 2006053231 A2 | 5/2006 |
| WO | 2007053626 A2 | 5/2007 |
| WO | 2016156813 A1 | 10/2016 |
| WO | 2018129111 A1 | 7/2018 |

OTHER PUBLICATIONS

Japanese Notification of Reason for Rejection dated Jul. 6, 2023 for corresponding Japanese application Serial No. 2021-527874, 28 pages.
British Examination Report dated May 13, 19 and Search Report dated May 10, 2019 for corresponding British Application No. GB1819055.3.
PCT Notification of Transmittal of the International Search Report and the Written Opinion of the International Searching Authority, or the Declaration dated Jan. 30, 2020, PCT Search Report and Written Opinion dated Jan. 30, 2020 for corresponding PCT Application No. PCT/GB2019/053294.
PCT Written Opinion dated Jan. 30, 2020 for corresponding PCT Application No. PCT/GB2019/053294.
Chinese Office Action and Supplemental Search Report dated Feb. 11, 2023 for corresponding Chinese application Serial No. 201980076879.9, 18 pages.

* cited by examiner

ABATEMENT

CROSS-REFERENCE OF RELATED APPLICATION

This application is a Section 371 National Stage Application of International Application No. PCT/GB2019/053294, filed Nov. 21, 2019, and published as WO 2020/104804A1 on May 28, 2020, the content of which is hereby incorporated by reference in its entirety and which claims priority of British Application No. 1819055.3, filed Nov. 22, 2018.

FIELD

The field of the invention relates to an abatement method.

BACKGROUND

Abatement apparatus for performing abatement are known and are typically used for treating an effluent gas stream from a manufacturing processing tool used in, for example, the semiconductor or flat panel display manufacturing industry. During such manufacturing, residual perfluorinated compounds (PFCs) and other compounds exist in the effluent gas stream pumped from the process tool. PFCs are difficult to remove from the effluent gas and their release into the environment is undesirable because they are known to have relatively high greenhouse activity.

Known abatement apparatus use combustion to remove the PFCs and other compounds from the effluent gas stream. Typically, the effluent gas stream is a nitrogen stream containing PFCs and other compounds. A fuel gas is mixed with the effluent gas stream and that gas stream mixture is conveyed into a combustion chamber that is laterally surrounded by the exit surface of a foraminous gas burner. Fuel gas and air are simultaneously supplied to the foraminous burner to affect flameless combustion at the exit surface, with the amount of air passing through the foraminous burner seeking to be sufficient to consume not only the fuel gas supply to the burner, but also all the combustibles in the gas stream mixture injected into the combustion chamber.

Although techniques exist for processing the effluent gas stream, they each have their own shortcomings. Accordingly, it is desired to provide an improved technique for processing an effluent gas stream.

The discussion above is merely provided for general background information and is not intended to be used as an aid in determining the scope of the claimed subject matter. The claimed subject matter is not limited to implementations that solve any or all disadvantages noted in the background.

SUMMARY

According to a first aspect, there is provided a method, comprising: supplying a combustion chamber of an abatement apparatus with an effluent stream containing a perfluoro compound, together with combustion reagents and a diluent; heating a combustion zone of the combustion chamber by reacting the combustion reagents to perform abatement of the perfluoro compound to stable by-products, the diluent being selected to remain inert during the abatement.

The first aspect recognises that a problem with abating some compounds is that nitrogen present during the abatement can react to generate NOx or other compounds, which it is increasingly desirable to reduce in the exhaust of an abatement apparatus.

Accordingly, a method is provided. The method may be a method of operating an abatement apparatus. The method may comprise the step of supplying or providing a combustion or reaction chamber with an effluent stream to be treated. The effluent stream may contain a perfluoro or other compound. The combustion chamber may be also supplied with reagents used to perform or create combustion. The combustion chamber may also be provided with a diluent or dilutant. The method may comprise heating or increasing the temperature of the combustion zone by reacting the combustion agents together to perform combustion. The heating may abate the perfluoro or other compounds to decompose those compounds to resultant by-products. The diluent may remain inert or unreactive during the abatement of the perfluoro or other compound. In this way, the perfluoro or other compound is abated in the combustion chamber during the combustion of the combustion reagents, but without creating undesirable compounds such as, for example, NOx or other compounds.

In one embodiment, the diluent is selected to be unchanged or unreactive during the abatement in the combustion zone. Accordingly, the diluent may fail to react and remains unchanged during combustion.

In one embodiment, the heating raises a temperature of the combustion zone to greater than around 1000° C.

In one embodiment, the heating raises a temperature of the combustion zone to greater than around 1300° C.

In one embodiment, the abatement apparatus comprises a nozzle for injecting a gas stream into the combustion chamber and the supplying comprises supplying the nozzle with the effluent stream. Accordingly, the effluent stream may be injected together with the gas stream from a nozzle into the combustion chamber.

In one embodiment, the supplying comprises supplying the nozzle with the combustion reagents and the diluent. Accordingly, the combustion reagents and/or the diluent may also be provided by the nozzle into the combustion chamber.

In one embodiment, the abatement apparatus comprises a pump which supplies the nozzle and the supplying comprises supplying the diluent as a pump purge gas. Accordingly, the diluent may also be provided as a purge gas for a pump which supplies the effluent stream to the nozzle.

In one embodiment, the abatement apparatus comprises a foraminous sleeve at least partially defining the combustion chamber for conveying a gas into the combustion chamber and the supplying comprises supplying the foraminous sleeve with the combustion reagents and the diluent. Accordingly, the abatement apparatus may utilise a foraminous burner through which the combustion reagents and the diluent may be provided into the combustion chamber.

In one embodiment, the method comprises comprising adjusting a ratio of flow rates of the diluent to the combustion reagents to provide a selected minimum destructive rate efficiency of at least one compound in the effluent stream. Accordingly, the ratio of the diluent to the combustion reagents may be adjusted, changed or selected to achieve a desired destructive rate efficiency of a compound in the effluent stream.

In one embodiment, the reagents comprise a fuel and an oxidant.

In one embodiment, the fuel comprises a hydrocarbon, methane, propane, butane and/or the like.

In one embodiment, the oxidant comprises oxygen, ozone and/or the like.

In one embodiment, the diluent comprises a noble gas and/or carbon dioxide.

In one embodiment, the diluent comprises a mixture of a noble gas and carbon dioxide.

In one embodiment, the diluent comprises a mixture of argon and carbon dioxide.

In one embodiment, the diluent comprises a mixture of argon and carbon dioxide in a ratio of around 80% of argon to around 20% of carbon dioxide by volume.

In one embodiment, the oxidant is mixed with carbon dioxide in a ratio of around 35% oxidant to around 65% carbon dioxide by volume.

In one embodiment, the oxidant is mixed with carbon dioxide in a ratio of around 37.5% oxidant to around 63.5% of carbon dioxide by volume.

In one embodiment, the oxidant is mixed with argon in a ratio of around 20% oxidant to around 80% argon by volume.

In one embodiment, the fuel is mixed with combined oxidant and carbon dioxide in a ratio of around 8% fuel to 92% combined oxidant and carbon dioxide by volume. In other words, fuel (such as methane) is added to a carbon dioxide and oxygen mixture such that the fuel forms around 8% of the total (i.e. $CH_4/[CH_4+O_2+CO_2]=8\%$. It will be appreciated that for higher-carbon fuels (such as propane), the ratio of fuel will be lower to achieve similar combustion conditions.

In one embodiment, the fuel is mixed with combined oxidant and argon in a ratio of around 4.5% fuel to around 95.5% combined oxidant and argon by volume. In other words, fuel (such as methane) is added to an argon and oxygen mixture such that the fuel forms around 4.5% of the total (i.e. $CH_4/[CH_4+O_2]=4.5\%$. It will be appreciated that for higher-carbon fuels (such as propane), the ratio of fuel will be lower to achieve similar combustion conditions.

In one embodiment, the method comprises recovering at least some of the diluent from an exhaust stream of the combustion chamber.

In one embodiment, the method comprises recirculating the diluent.

In one embodiment, the method comprises recirculating the diluent together with at least one of the oxidant and the fuel as a contaminant to the combustion chamber.

Further particular and preferred aspects are set out in the accompanying independent and dependent claims. Features of the dependent claims may be combined with features of the independent claims as appropriate, and in combinations other than those explicitly set out in the claims.

Where an apparatus feature is described as being operable to provide a function, it will be appreciated that this includes an apparatus feature which provides that function or which is adapted or configured to provide that function.

The Summary is provided to introduce a selection of concepts in a simplified form that are further described in the Detail Description. This summary is not intended to identify key features or essential features of the claimed subject matter, nor is it intended to be used as an aid in determining the scope of the claimed subject matter.

BRIEF DESCRIPTION OF THE DRAWINGS

Embodiments of the present invention will now be described further, with reference to the accompanying drawings, in which.

DETAILED DESCRIPTION

Before discussing the embodiments in any more detail, first an overview will be provided. Embodiments provide an arrangement whereby nitrogen or another compound, which would normally be present in a combustion or reaction chamber performing abatement on an effluent stream, and which would produce one or more undesirable by-products within the combustion chamber, is instead replaced by an inert compound which acts as a diluent to preserve the chemical and thermal conditions within the combustion chamber to maintain the appropriate conditions to perform abatement on the effluent stream without generating the undesirable by-products. For example, the avoidance of nitrogen during the abatement prevents the production of NOx, since the abatement would typically occur at temperatures where nitrogen would readily react with oxygen to produce NOx. By supplying a diluent which is typically inert or unreactive under the operating conditions within the combustion chamber, no undesirable NOx is formed. By adjusting the composition of the diluent, the destructive rate efficiency (DRE) of compounds in the effluent stream is increased while NOx generation is decreased, minimised or eliminated. In particular, a mixture of an inert (typically noble) gas and carbon dioxide helps to reduce NOx production and maximise destructive rate efficiency of compounds in the effluent stream. Accordingly, nitrogen is removed from the flame front. An inert gas such as argon or carbon dioxide is used a pump purge instead of nitrogen and/or an argon/oxygen/$CH_4$ and/or carbon dioxide/oxygen/$CH_4$ pre-mix is used on the burner instead of air (which contain nitrogen). The carbon dioxide/argon and oxygen can be separated and recovered from the exhaust to be reused.

Abatement Apparatus

Figure 1:
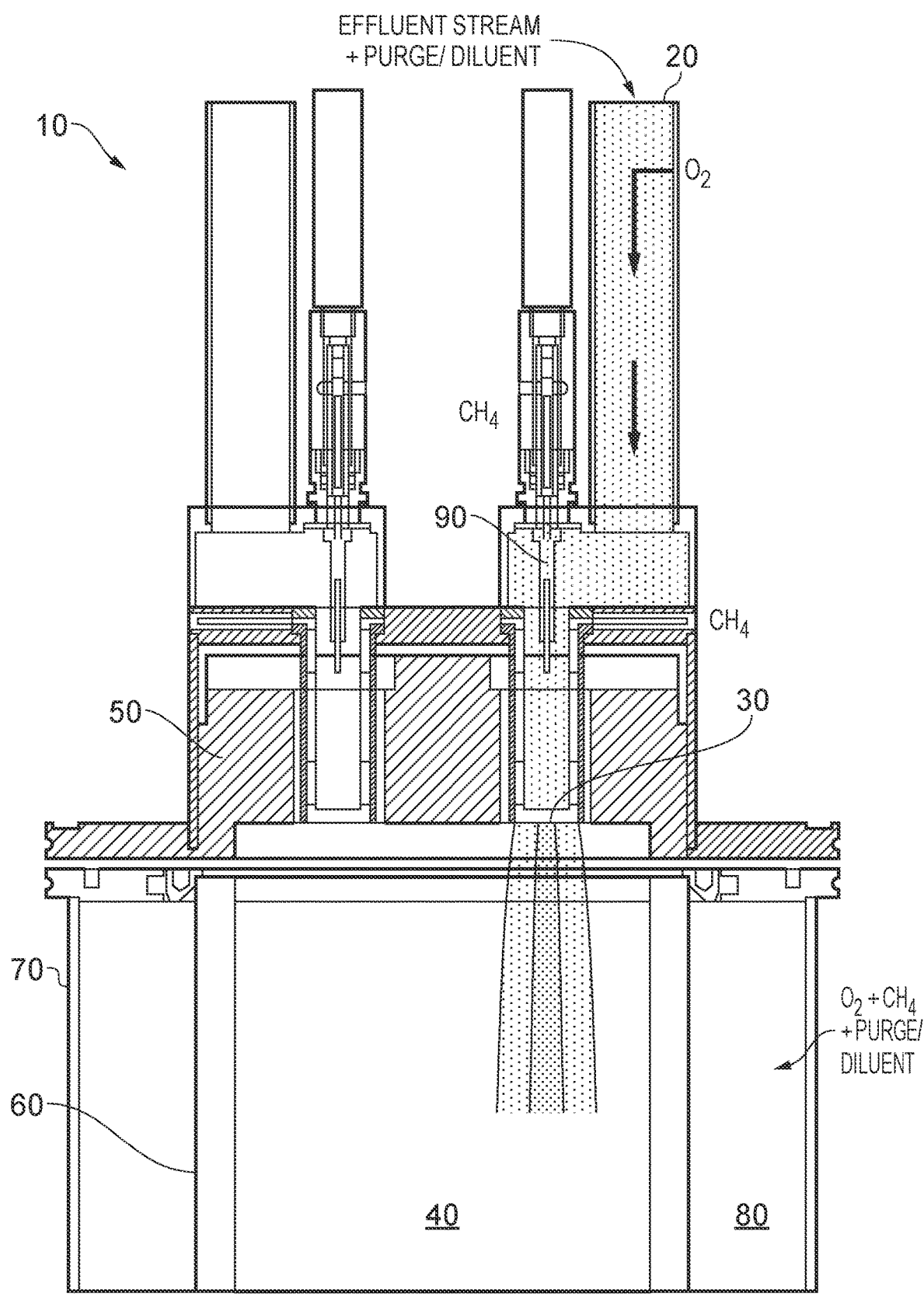
FIG. 1 illustrates an abatement apparatus according to one embodiment.

FIG. 1 illustrates an abatement apparatus, generally 10, according to one embodiment. The abatement apparatus 10 comprises a radiant burner which treats an effluent gas stream (which contains a purge gas) pumped from a manufacturing process tool, such as a semiconductor or flat panel display process tool, typically by means of a vacuum pumping system (not shown). The effluent stream is received at inlets 20. The effluent stream is conveyed from the inlet 20 to a nozzle 30 which injects the effluent stream into a cylindrical combustion chamber 40. Each nozzle 30 is located within a respective bore formed in a ceramic top plate 50 which defines an upper or inlet surface of the combustion chamber 40. An oxidant, in this example oxygen, is mixed with the effluent stream as it is conveyed from the inlet 20 to the nozzle 30. A fuel gas is conveyed to a concentric conduit which surrounds the nozzle 30 for delivery as a surrounding curtain into the combustion chamber 40. A fuel gas is also conveyed via a concentric lance 90 located within the nozzle 30 for delivery as an inject into the combustion chamber 40.

The combustion chamber 40 has sidewalls defined by an exit surface of a foraminous burner element 60 such as that described in EP 0 694 735. The burner element 60 is cylindrical and is retained within a cylindrical outer shell 70. A plenum volume 80 is defined between an entry surface of the burner element 60 and the cylindrical outer shell 70. A mixture of fuel gas, such as natural gas or a hydrocarbon, and an oxidant and purge gas is introduced into the plenum volume 80 via one or more inlet nozzles (not shown). The mixture of fuel gas and oxidant and purge gas passes from the entry surface of the burner element to the exit surface of the burner element for combustion within the combustion chamber 40.

The ratio of the mixture of fuel gas and oxidant and purge gas is varied to vary the temperature within the combustion chamber 40 to that which is appropriate for the effluent stream to be treated. Operating temperatures within the combustion chamber 40 start at around 800° C. to around 900° C. for some abatement processes. However, the temperatures can also be set to around 1300° C. to around 1500° C. for other abatement processes. At these temperatures, nitrogen present in the combustion chamber 40 can react to produce NOx. Also, the rate at which the mixture of fuel gas and oxidant and purge gas is introduced into the plenum volume 80 is adjusted so that the mixture will burn without visible flame at the exit surface of the burner element 60. The exhaust from the combustion chamber is vented into a downstream cooling chamber (not shown).

Accordingly, the effluent stream received through the inlets 20 and provided by the nozzles 30 to the combustion chamber 40 is combusted within the combustion chamber which is heated by the mixture of fuel gas and oxidant which combusts near the exit surface of the burner element 60 and forms a flame extending from the nozzles 30. Such combustion causes heating of the combustion chamber and provides combustion products, such as oxygen, typically within a range of 7.5% to 10.5% depending on the air/fuel mixture [$CH_4$, $C_3H_8$, $C_4H_{10}$], provided to the combustion chamber 40. This heat and the combustion products react with the effluent stream within the combustion chamber 40 to clean the effluent stream. For example, $SiH_4$ and $NH_3$ may be provided within the effluent stream, which reacts with $O_2$ within the combustion chamber 40 to generate $SiO_2$, $N_2$, $H_2O$, $NO_x$. Similarly, $N_2$, $CH_4$, $C_2F_6$ may be provided within the effluent stream, which reacts with $O_2$ within the combustion chamber 40 to generate $CO_2$, HF, $H_2O$. The combusted effluent stream exhausts from the abatement apparatus 10 and comprises the treated stream.

Existing Operation

During existing operation, the purge gas supplied the effluent stream is nitrogen. When operating the abatement apparatus 10 (having four inlets 20 having a 6" diameter and 3" length) with the effluent stream containing 50 l/min of $N_2$ leads to 43 ppm of NOx and a $CF_4$ DRE of 94.2%.

Argon Substitution

Figure 2:
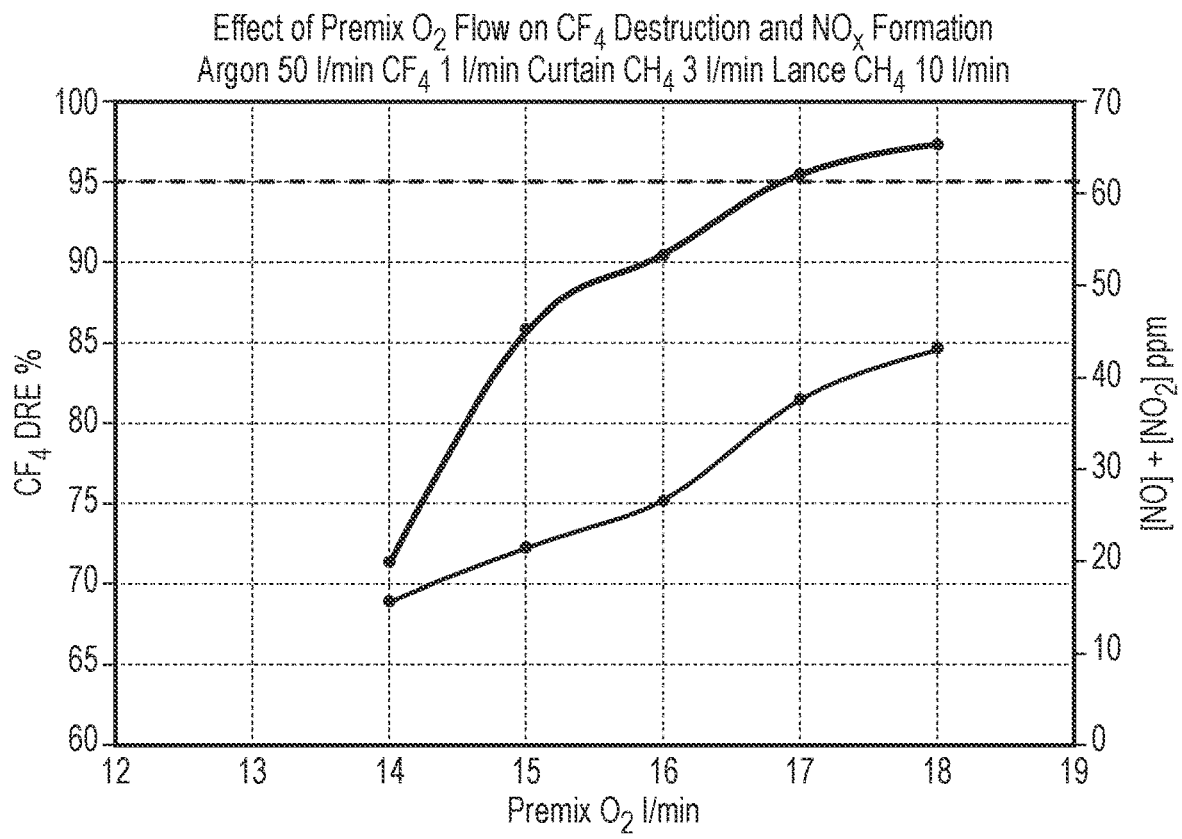
FIGS. 2 to 5 show changes in $CF_4$ DRE and NOx production under different conditions.
Figure 3:
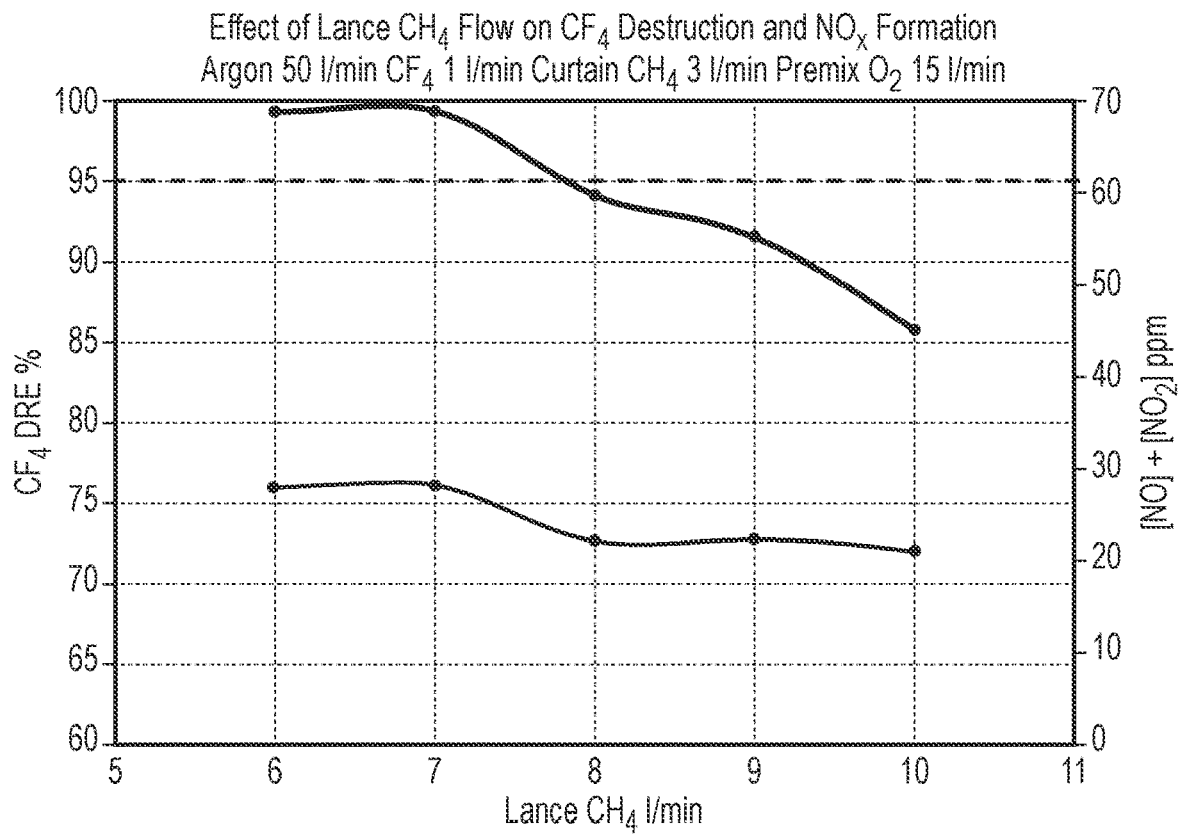
Figure 4:
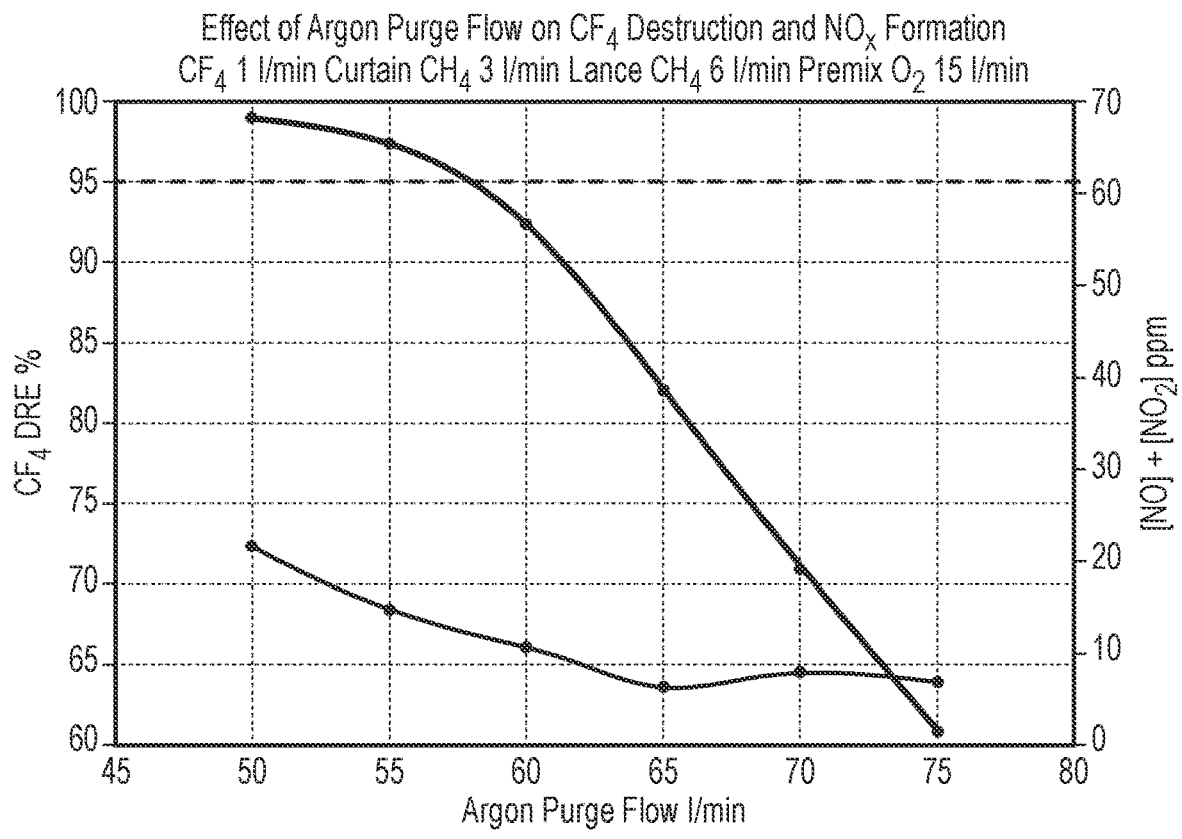
Figure 5:
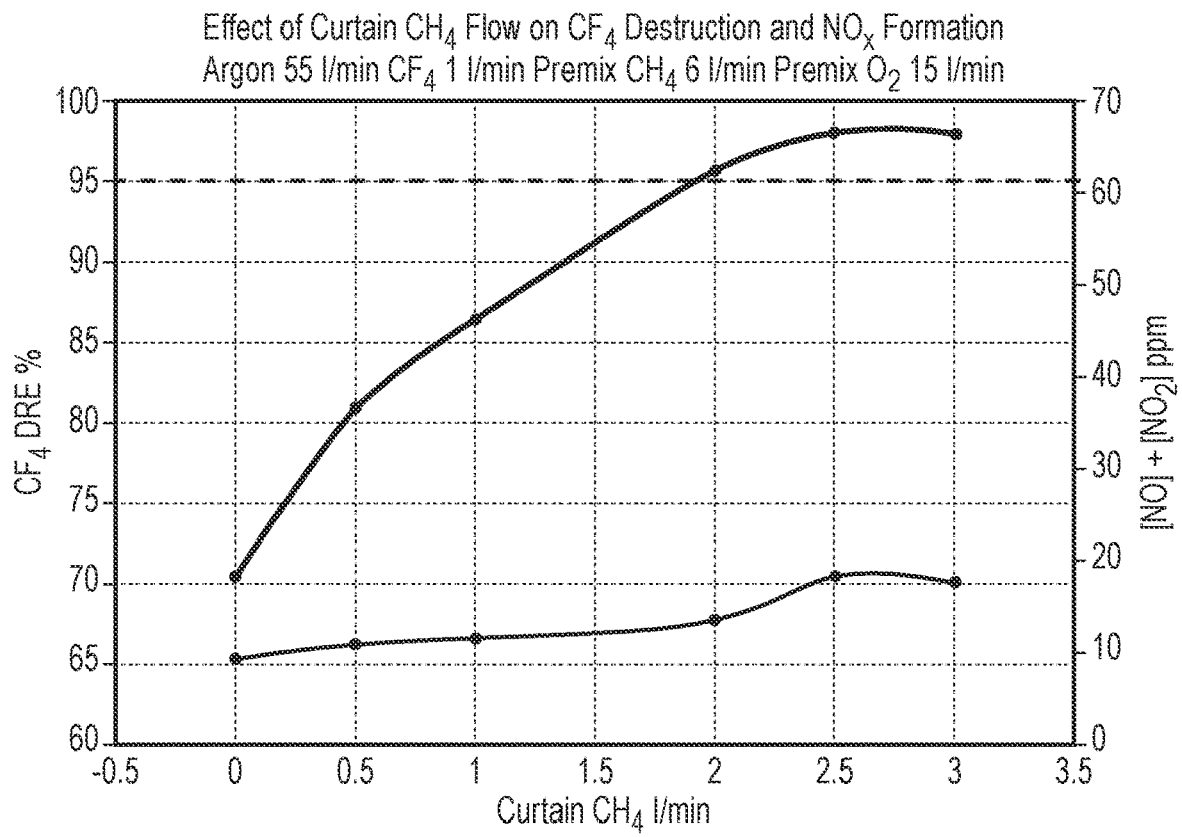

In one embodiment, argon (or other noble gas) is substituted to replace nitrogen as the purge gas. FIGS. 2 to 5 show the changes in $CF_4$ DRE and NOx production with variations in premix $O_2$ (FIG. 2), variations in lance $CH_4$ (FIG. 3), Argon flow (FIG. 4) and curtain $CH_4$ (FIG. 5). In particular, FIG. 2 shows the effect of premix $O_2$ flow on $CF_4$ destruction and NOx formation with Argon at 50 l/min, $CF_4$ 1 l/min, curtain $CH_4$ 3 l/min and lance $CH_4$ 10 l/min; FIG. 3 shows the effect of lance $CH_4$ flow on $CF_4$ destruction and NOx formation with Argon at 50 l/min, $CF_4$ 1 l/min, curtain $CH_4$ 3 l/min and premix $O_2$ 15 l/min; FIG. 4 shows the effect of Argon purge flow on $CF_4$ destruction and NOx formation with $CF_4$ 1 l/min, curtain $CH_4$ 3 l/min, lance $CH_4$ 6 l/min and premix $O_2$ 15 l/min; FIG. 5 shows the effect of curtain $CH_4$ on $CF_4$ destruction and NOx formation with Argon at 55 l/min, $CF_4$ 1 l/min, $CH_4$ 6 l/min and premix $O_2$ 15 l/min. As can be seen particularly in FIG. 4, optimising the operating conditions of the abatement apparatus 10 when using argon (or other noble gas) leads to up to a 75% reduction in NOx. If all flows (pump purge, $CF_4$, inject $CH_4$, curtain $CH_4$, inject $O_2$) remain constant, the NOx generation when using argon (or other noble gas) is slightly higher than with nitrogen as the purge gas but the $CF_4$ destruction efficiency is substantially improved, indicating that the production of NOx at the flame-front does not discriminate between upstream nitrogen (from the process gas or effluent stream) and downstream nitrogen (in the radiant burner combustion by-products). When using argon (or other noble gas) instead of nitrogen, the change in inject $CH_4$ flow rate required to maintain the DRE achieved when using nitrogen (by maintaining a similar flame temperature) varies generally in proportion to the ratio of Cp (heat capacity at constant pressure) of argon (or other noble gas) relative to nitrogen. Hence, if it is assumed that the DRE for $CF_4$ provides an indication of the flame temperature, then substituting argon for nitrogen and adjusting the inject flow rates leads to around a 75% reduction in NOx emissions for a similar flame temperature. Accordingly, recognising that the ratio of the specific heat capacities of argon and nitrogen is 0.72, inject $CH_4$ and $O_2$ flows were reduced in a stepwise fashion, targeting 95% CF4 DRE. All other flows were kept constant. The result was an approximately 5-fold reduction in NOx compared to existing operating conditions. Hence, it has been demonstrated that while not entirely eliminating NOx, the use of argon as an inert gas purge gives a substantial reduction in NOx emissions and a moderate reduction in the consumption of fuel and oxygen.

When operating the abatement apparatus 10 (having four inlets 20 having a 6" diameter and 3" length) with the effluent stream containing 50 l/min of Ar leads to 61 ppm of NOx and a $CF_4$ DRE of 98.3%. Accordingly, it can be seen that the presence of argon improves the DRE, but leads to an increase in the amount of NOx. This is because the specific heat capacity of argon differs to that of nitrogen. Ar Cp (J·mol-1·K-1) is 0.71× that of $N_2$—which improves abatement. Ar Cp/Cv=γ is 1.67 compared to 1.4 for $N_2$—which is bad for vacuum pumps. However, by optimising the inject conditions for Ar leads to an 80% reduction in NOx emissions compared to the existing operation using $N_2$ described above.

Carbon Dioxide Substitution

Another inert gas of interest is carbon dioxide. $CO_2$ is readily available and cheaper than argon. For example, typical current bulk gas prices per m³ are: $N_2$ $0.16; $CO_2$ $0.72; Ar $1.09. Furthermore, carbon dioxide should be better behaved in the vacuum pump as the ratio Cp/Cv or γ is high for monoatomic gases such as argon leading to significant heat of compression within the pumping mechanism. Hence, use of argon can lead to over-heating of the pump but this would be less likely with carbon dioxide. In embodiments, carbon dioxide is substituted to replace nitrogen as the purge gas.

In one embodiment, under standard inject conditions (for 50 l/min nitrogen purge), when operating the abatement apparatus 10 (having four inlets 20 having a 6" diameter and 3" length) with the effluent stream containing 50 l/min of $CO_2$ leads to 19 ppm of NOx and a $CF_4$ DRE of 12%.

In one embodiment, using 25 l/min of $CO_2$, leads to 38 ppm of NOx and a $CF_4$ DRE of 90%. In another embodiment, the inject conditions are scaled to give an equivalent burning velocity with the effluent stream containing 40 l/min of $CO_2$ together with 40 l/min of $O_2$ and 22 l/min of $CH_4$ which leads to 40 ppm of NOx and a $CF_4$ DRE of 98%. In a further embodiment, $O_2$ remains at 40 l/min, but $CH_4$ is reduced to 20 l/min which leads to 25 ppm of NOx and a $CF_4$ DRE of 95%. These can be further optimised with flow rates of around 2 times that of nitrogen and 3.6 times that of argon, in line with specific heat capacity and burning velocity considerations. Hence, it can be seen that $CO_2$ substitution also results in reduced NOx formation, but at the expense of increased $CH_4$ and $O_2$ usage, broadly in proportion to the specific heat capacities of $N_2$, Ar and $CO_2$.

When the pump purge was replaced with $CO_2$ similar results were obtained—high $CF_4$ DRE and low NOx emission, but significantly higher flows of injected methane and oxygen were required—at least twice the flow rates required for nitrogen. There is a correlation between these higher flows and parameters including the specific heat capacity of $CO_2$ and the peak burning velocity of $CH_4/CO_2/O_2$ mixtures According, it can be seen that argon gives the best abatement efficiency and lowest NOx but is not preferred as a pump purge. Also, carbon dioxide, whilst suitable for use as a pump purge, requires approximately twice the injected methane and oxygen as nitrogen.

Combined Argon & Carbon Dioxide Substitution

As mentioned above, a high γ can lead to overheating and, in particular, a threshold value of γ can be established above which pumps are likely to overheat and seize. Mixtures as high as 75% argon (balance nitrogen) can be pumped successfully. The value of γ can be calculated for this mixture as the ratio of the components. From this, the proportions of argon and carbon dioxide can be calculated which, once blended, will have the same γ and can be pumped successfully. Those calculations show that a mixture of 81% argon/19% carbon dioxide would behave in a similar manner.

Therefore, $CF_4$ abatement and NOx production measurements were also performed with this mixed $Ar/CO_2$ purge gas. In one embodiment, under standard inject conditions (for 50 l/min nitrogen purge), when operating the abatement apparatus 10 (having four inlets 20 having a 6" diameter and 3" length) with the effluent stream containing 50 l/min of Ar & $CO_2$ mix (81%:19%) leads to 12 ppm of NOx and a $CF_4$ DRE of 97.5%. Again, the result was high $CF_4$ DRE and low NOx. Inject flows were comparable to those used with standard nitrogen purges.

Combustion Chamber Operation

When operating the combustion chamber 40 with nitrogen, the lower flammable limit is achieved when the following are achieved $N_2/O_2(79\%/21\%)/CH_4$ (5.2%). The peak burning velocity (21% $O_2$) is 36 cm·s−1.

When operating the combustion chamber 40 with carbon dioxide, the lower flammable limit is achieved when the following are achieved $CO_2/O_2(79\%/21\%)/CH_4$ (7%). The peak burning velocity (21% $O_2$) is 1.4 cm·s−1.

The predicted stable operating conditions are with 8% $CH_4$ in the pre-mix (1.2× the lower flammable limit) and a ratio of $O_2/O_2+CO_2$ of 35% $O_2$ which is a similar ratio of peak burning velocity to total flow.

The predicted exhaust composition (dry) burner only is 18.7% $O_2$ with the balance $CO_2$.

The predicted exhaust composition (dry) burner with four inlets in optimised high fire with argon purge is 7% $O_2$, 50% Ar with the balance $CO_2$.

In one embodiment, the burner is operated on $Ar/O_2/CH_4$ rather than the $N_2/O_2/CH_4$ (fuel-air premix).

In another embodiment, the burner is operated on $CO_2/O_2/CH_4$. In one embodiment, under standard inject conditions (for 50 l/min nitrogen purge), when operating the abatement apparatus 10 (having four inlets 20 having a 6" diameter and 3" length) with the effluent stream containing 130 l/min of $CO_2$ together with 70 l/min of $O_2$ giving a ratio of $O_2/(O_2+CO_2)$ of 35% $O_2$ and 20 l/min of $CH_4$ giving a ratio of $CH_4/(CH_4+O_2+CO_2)$ of 9% $CH_4$ leads to 98 ppm of NOx and a $CF_4$ DRE of 98.7%.

In one embodiment, 17 l/min of premixed $O_2$ with 13 l/min $CH_4$ (10 l/min provided on the lance and 3 l/min provided on the curtain), leads to 32 ppm of NOx and a $CF_4$ DRE of 93.5% (compared to 43 ppm of NOx and a $CF_4$ DRE of 94.2% for the existing operation mentioned above).

Figure 6:
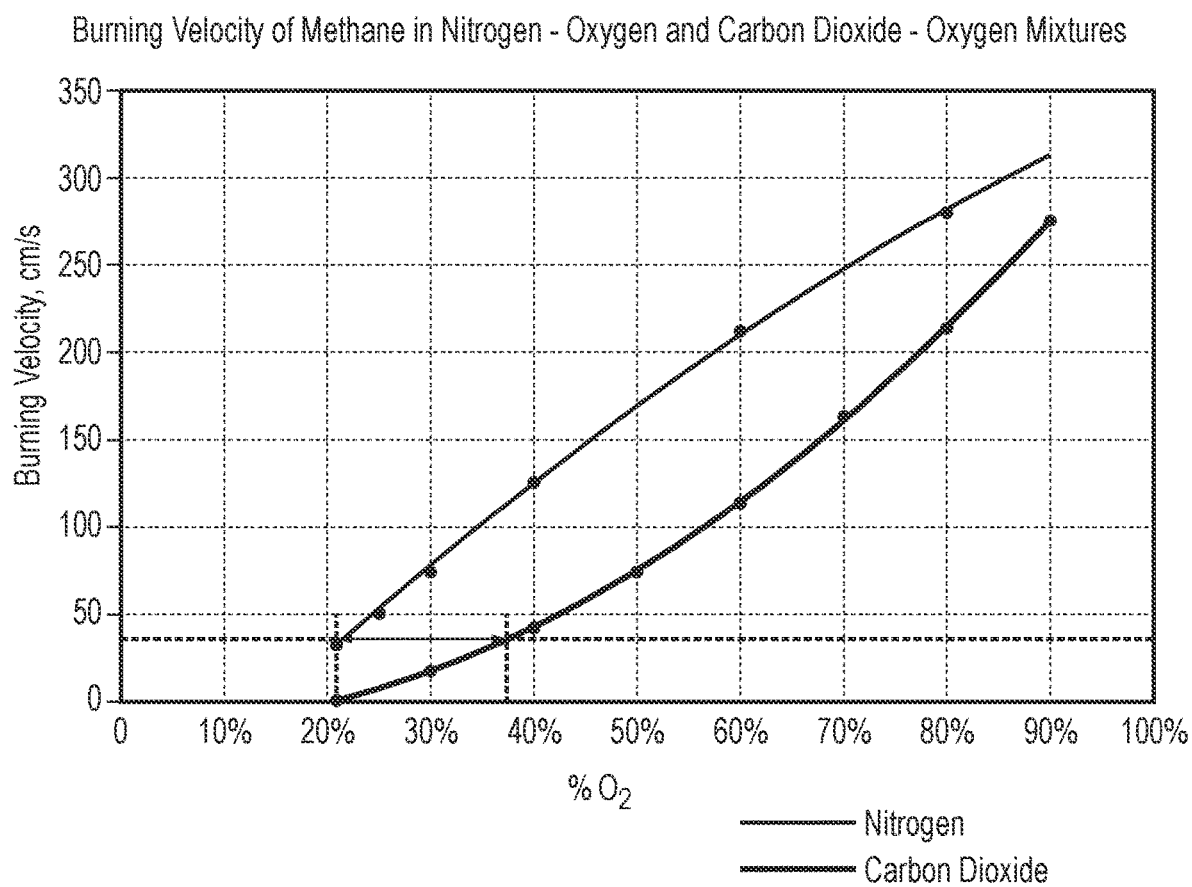
FIG. 6 show changes in peak (stoichiometric) burning velocity versus $O_2$ under different conditions.

As illustrated in FIG. 6, (which shows the burning velocity of methane in nitrogen-oxygen (upper curve) and carbon dioxide-oxygen (lower curve) mixtures) calculations show that by plotting the peak (stoichiometric) burning velocity versus $O_2$ concentration for the $N_2/O_2/CH_4$ and $CO_2/O_2/CH_4$ systems, 37.5% $O_2$ in $CO_2$ has the same peak burning velocity as 21% $O_2$ in $N_2$ (air). The burner is typically operated at around 6% $CH_4$—1.15 times the lower flammable limit of $CH_4$ in air (5.2%). So, with the $CO_2/O_2$ system, the ideal $CH_4$ concentration is around 8%—1.15 times the lower flammable limit which is 7%. A further consideration is the total volumetric flow through the burner. Using the above figures as a guide, revised conditions seek to maintain the ratio of burning velocity to volumetric flow between the two systems, suggesting that a value of 35% $O_2$ in $CO_2$ would be more appropriate.

Gas Recovery

The downstream cooling chamber may feed a recovery device (not shown). The recovery device can be any of a different number of devices such as a cryogenic distillation device, a pressure (vacuum) sing adsorption device, a ceramic or polymer membrane separation device which separates the gases and produces a at least one of a pure stream from the pump purge and an oxygen rich stream for the burner.

The exhaust stream of the burner, after wet scrubbing, will contain primarily $CO_2$ and $O_2$ at 100% relative humidity (at the temperature of the packed tower) often with traces of CO and other contaminants. One embodiment recycles this back to the burner as a diluent, being "made up" with $O_2$ and $CH_4$ to the required proportions. Combustible contaminants might be fully oxidised over a combustion catalyst such as "Hopcalite" (Molecular Products, Thaxted, UK supply a room temperature combustion catalyst based on a CuO/$MnO_2$ mix; the product is called Moleculite).

In one embodiment, the exhaust from the burner, is passed to a separation unit configured to produce a stream of pure $CO_2$ for purging the vacuum pumps along with an impure stream comprising $CO_2$ and $O_2$ to be used in the radiant burner as above. Recognising that $CO_2$ is a by-product of burning hydrocarbon fuels, the system is self-sufficient; once primed, no additional $CO_2$ is required.

If the pump purges contain a high proportion of argon, the exhaust from the burner, may be passed to a separation unit configured to produce a first stream of pure $CO_2$, a second stream of pure argon and a third impure stream comprising predominantly $O_2$ with residual argon. Some of the $CO_2$ would be blended with the argon to be used as pump purge while the $O_2$ rich stream could be used in the radiant burner as above. By returning the $O_2$ rich stream as described above, the residual argon is not lost from the system.

Although illustrative embodiments of the invention have been disclosed in detail herein, with reference to the accompanying drawings, it is understood that the invention is not limited to the precise embodiment and that various changes and modifications can be effected therein by one skilled in the art without departing from the scope of the invention as defined by the appended claims and their equivalents.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are described as example forms of implementing the claims.

The invention claimed is:

1. A method, comprising:
supplying a combustion chamber of an abatement apparatus with an effluent stream containing a perfluoro compound, together with combustion reagents and a diluent comprising a mixture of a noble gas and carbon dioxide, wherein a percentage of carbon dioxide in the mixture is set equal to or less than twenty percent by volume while allowing for pumping of the diluent without overheating a pump;
heating a combustion zone of said combustion chamber by reacting said combustion reagents to perform abatement of said perfluoro compound to stable by-products, said diluent being selected to remain inert during said abatement.

2. The method of claim 1, wherein said heating raises a temperature of said combustion zone to greater than 1000° C.

3. The method of claim 1, wherein said abatement apparatus comprises a nozzle for injecting a gas stream into said combustion chamber and said supplying comprises supplying said nozzle with said effluent stream, said combustion reagents and said diluent.

4. The method of claim 3, wherein the pump supplies said nozzle and said supplying comprises supplying said diluent as a pump purge gas.

5. The method of claim 1, wherein said abatement apparatus comprises a foraminous sleeve at least partially defining said combustion chamber for conveying a gas into said combustion chamber and said supplying comprises supplying said foraminous sleeve with said combustion reagents and said diluent.

6. The method of claim 1, comprising adjusting a ratio of flow rates of said diluent to said combustion reagents to provide a selected minimum destructive rate efficiency of at least one compound in said effluent stream.

7. The method of claim 1, wherein said combustion reagents comprise a fuel and an oxidant.

8. The method of claim 7, wherein said fuel comprises at least one of a hydrocarbon, methane, propane, and butane.

9. The method of claim 7, wherein said oxidant comprises at least one of oxygen, and ozone.

10. The method of claim 7, wherein said oxidant is mixed with carbon dioxide in a ratio of around 35% oxidant to around 65% carbon dioxide by volume.

11. The method of claim 7, wherein said oxidant is mixed with carbon dioxide in a ratio of around 37.5% oxidant to around 63.5% carbon dioxide by volume.

12. The method of claim 7, wherein said oxidant is mixed with argon in a ratio of around 20% to around 80% argon by volume.

13. The method of claim 7, wherein said fuel is mixed with carbon dioxide in a ratio of around 8% fuel to around 92% carbon dioxide by volume.

14. The method of claim 7, wherein said fuel is mixed with combined oxidant and argon in a ratio around 4.5% fuel to around 95.5% combined oxidant and argon by volume.

15. The method of claim 1, wherein said noble gas comprises argon.

16. The method of claim 1, wherein said diluent comprises a mixture of argon and carbon dioxide in a ratio of around 80% of argon to around 20% of carbon dioxide by volume.

17. The method of claim 1, comprising recovering and/or recirculating at least some of said diluent from an exhaust stream of said combustion chamber and/or comprising recirculating said diluent together with at least one of said oxidant and said fuel as a contaminant to said combustion chamber.

* * * * *